(12) United States Patent
Obitz

(10) Patent No.: US 7,234,915 B2
(45) Date of Patent: Jun. 26, 2007

(54) SLUICE FEEDER

(76) Inventor: Lars Obitz, Isterberget 3, Vaxholm (SE) Se-18500

( * ) Notice: Subject to any disclaimer, the term of this patent is extended or adjusted under 35 U.S.C. 154(b) by 65 days.

(21) Appl. No.: 10/506,785

(22) PCT Filed: Mar. 4, 2003

(86) PCT No.: PCT/SE03/00358

§ 371 (c)(1),
(2), (4) Date: Apr. 7, 2005

(87) PCT Pub. No.: WO03/074779

PCT Pub. Date: Sep. 12, 2003

(65) Prior Publication Data

US 2005/0189082 A1 Sep. 1, 2005

(30) Foreign Application Priority Data

Mar. 7, 2002 (SE) .................................. 0200688

(51) Int. Cl.
*F04D 1/08* (2006.01)
(52) U.S. Cl. ..................................... 415/83; 415/121.1
(58) Field of Classification Search .................. 415/83, 415/121.1, 136, 169.1, 169.2; 222/367, 394
See application file for complete search history.

(56) References Cited

U.S. PATENT DOCUMENTS 2,606,502 A * 8/1952 Carlson ........................ 415/83
4,011,027 A * 3/1977 Selder ...................... 415/121.3
4,201,487 A * 5/1980 Backhaus .................... 366/304

FOREIGN PATENT DOCUMENTS

JP          54108904 A   *   8/1979
SE          C2 516 001       11/2001

\* cited by examiner

*Primary Examiner*—Edward K. Look
*Assistant Examiner*—Dwayne J White
(74) *Attorney, Agent, or Firm*—Dowell & Dowell, P.C.

(57) ABSTRACT

The invention concerns a sluice feeder comprising an inlet (1), an outlet (11), and a rotor (2), into which sluice feeder material to be fed from a first medium to a second medium sealed from the first medium is fed to the inlet (1). The inlet (1) is directed towards the centre portion of the rotor (2), the rotor (2) and a cooperating stator (7), respectively, show at least a radial opening (5, 8) each and are provided so that at least one pocket (9) is formed, which alternating opens and seals upon rotation of the rotor (2). The material is thrown radially outwards by the rotor (2) to the pocket (9) to finally be emptied from the pocket (9) to the outlet at the same time as the pocket (9) is sealed towards the inlet (1) by means of the stator (7).

5 Claims, 3 Drawing Sheets

SLUICE FEEDER

Figure 1:
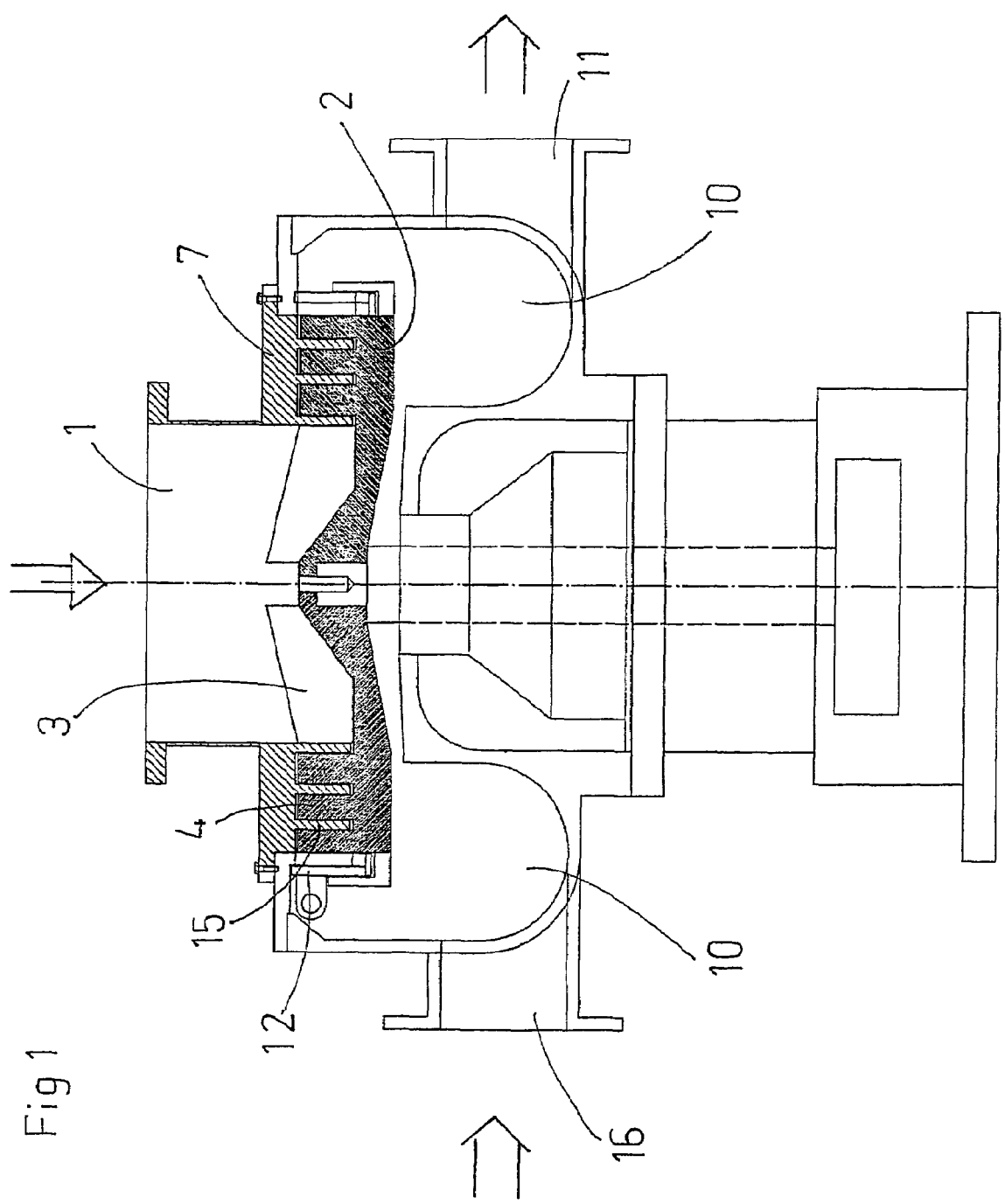

The present invention concerns a sluice feeder for, for example, feeding of fibres from a fibre separation step in a first medium, for example steam, to, for example, a drying step in a second medium, for example air, whereby the two media are sealed from each other.

BACKGROUND TECHNOLOGY

When preparing wood fibres a separation of fibres from steam takes place in a fibre separation step where a cyclone or a centrifugal separator is used for this purpose. Preferably the steam is recycled also from this step. The pressure in the system before the fibre separation is in most cases 3-12 bar. The following process step may be the drying of the fibre. This takes place at a lower pressure, sometimes as low as atmospheric pressure. In order to prevent the steam from escaping to the drying step at lower pressure a pressure tight feeding of the fibre from the separation step is required.

When treating mechanical pulp for paper manufacturing this can be easily solved by a plug screw where the fed fibres are compressed and form a steam tight plug in the plug screw at the same time as it is further fed and subsequently may be fed to further treatment at a lower pressure.

On the contrary, when treating mechanical pulp for manufacturing of, for example, fibre board or MDF-technology, it is not possible to compress the fibres since lumps are thus formed, which cause problems at the drying of the fibres and at following manufacturing of end products. Instead a sluice feed may be used in which the separated fibre fall down into a pocket in its rotor provided in the sluice feeder, which rotor is rotated and the fibre falls out in the lower portion of the sluice feeder where a lower pressure may prevail without being compressed. The rotor and its pockets are sealed against the periphery of the sluice feeder.

A problem with traditional sluice feeders is that they cannot be driven at high speed since the fibres then will be thrown out of the rotor and thus the capacity will decrease. Since these sluice feeders must be rotated slowly they must be made large and voluminous in order to be able to sluice desired quantity of fibre in a certain period of time so that the production is not obstructed.

SUMMARY OF THE INVENTION

The problem the present invention aims to solve is to provide a sluice feeder for feeding fibres from a fibre separation step in a first medium to a process step in a second medium essentially without any energy losses.

This is solved by a sluice feeder according to claim 1.

An advantage with this sluice feeder is that it may be driven very fast, which is not possible with traditional sluice feeders. This also result in that the dimension of the sluice feeder may be kept small and neat.

The fibres are separated from steam at the previous process step and this is preferably done by means of a centrifugal separator, which also ought to be equipped in such a way that it can utilize the steam and be followed by a process step for recycling the energy content of the steam.

SHORT DESCRIPTION OF THE DRAWINGS

The invention will now be described in an exemplifying manner and referring to enclosed drawings, in which:

FIG. 1: illustrates a sluice feeder according to the present invention in a cross sectional view.

Figure 2:
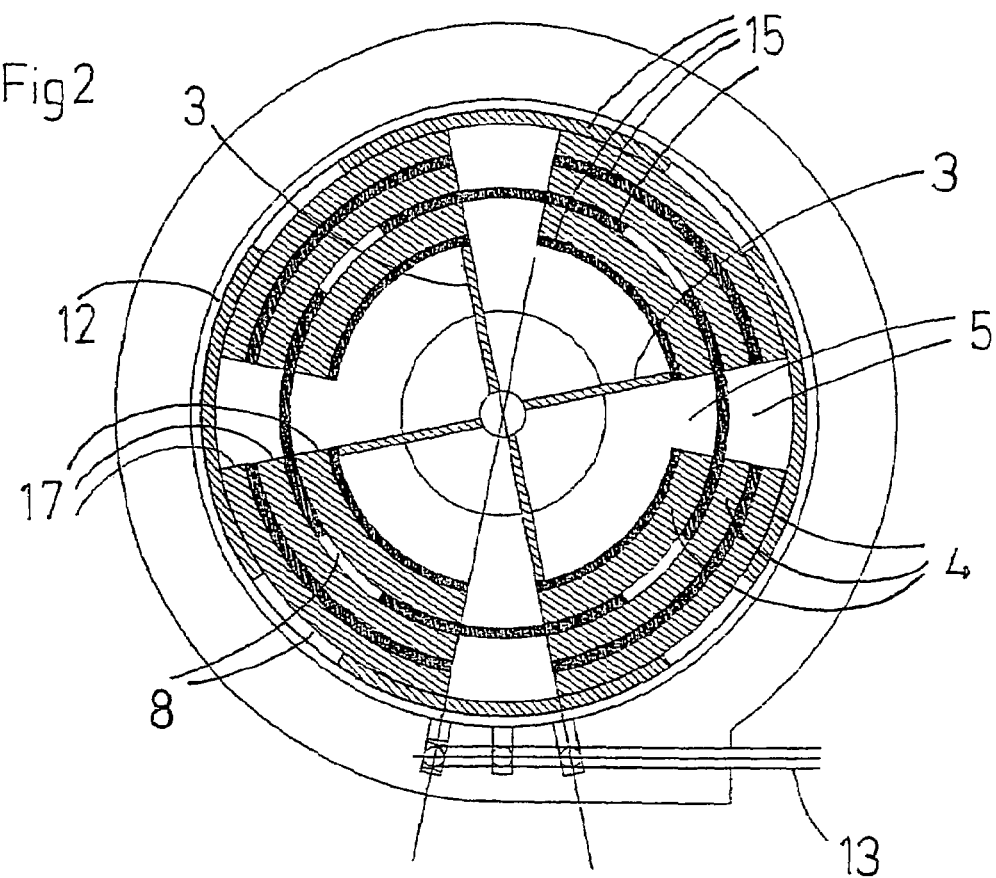
Figure 3:
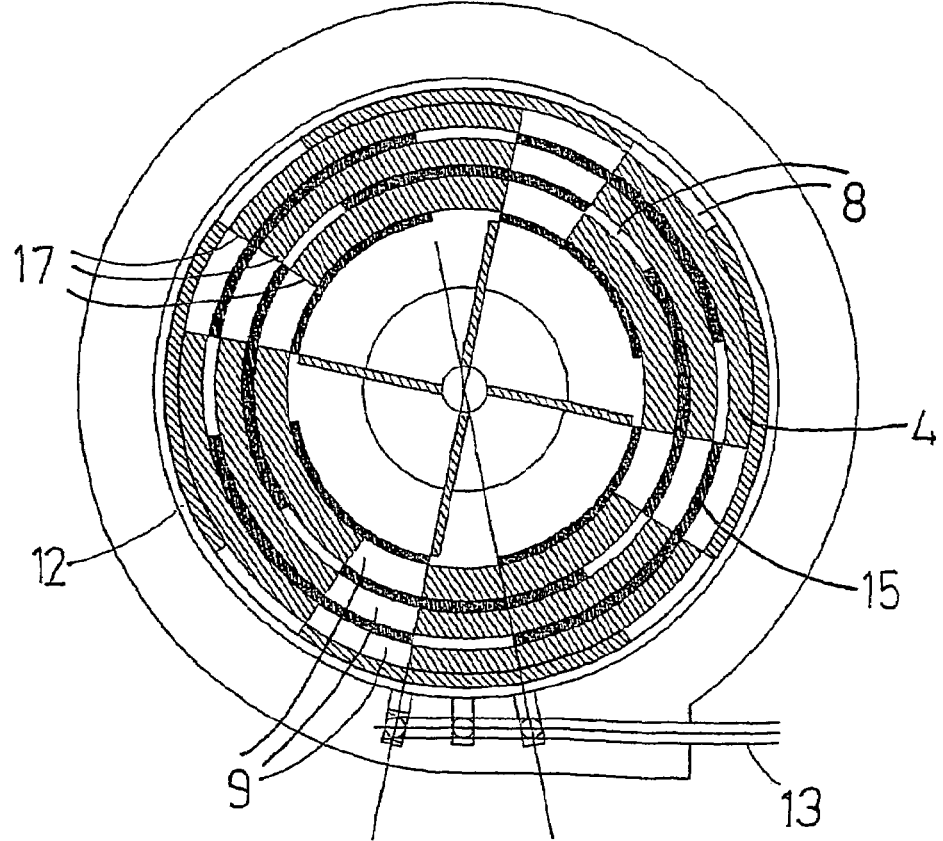
Figure 4:
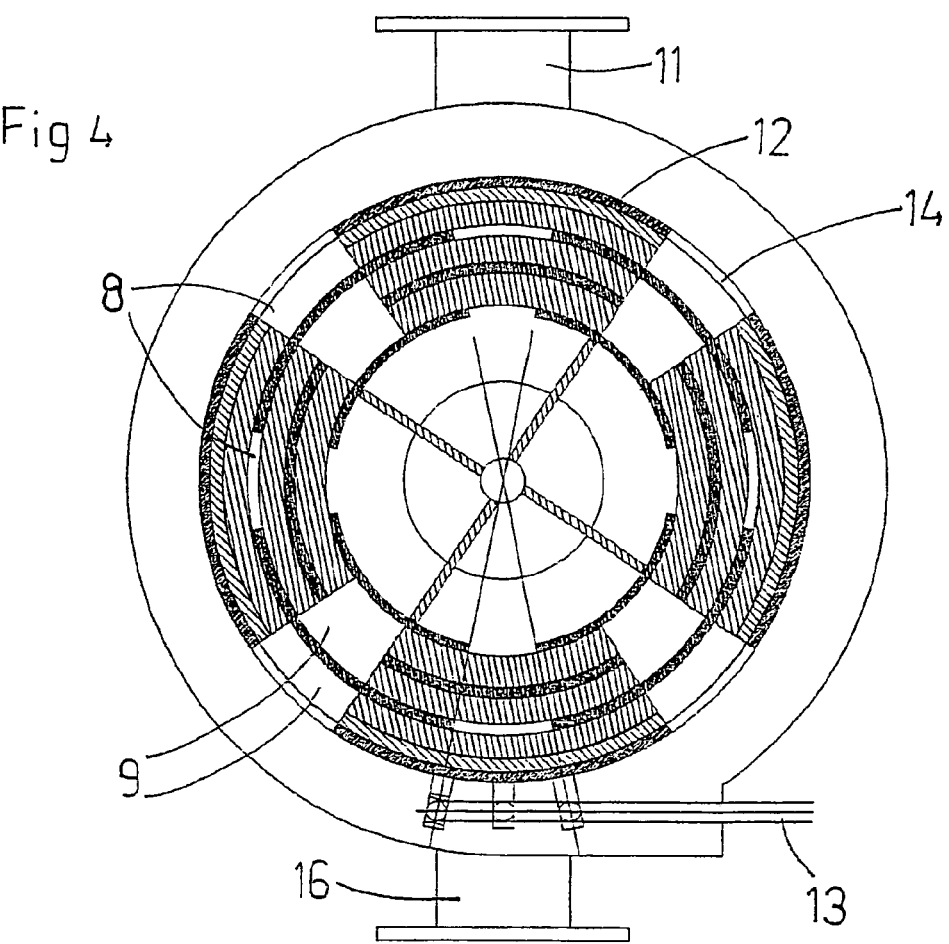
Figure 5:
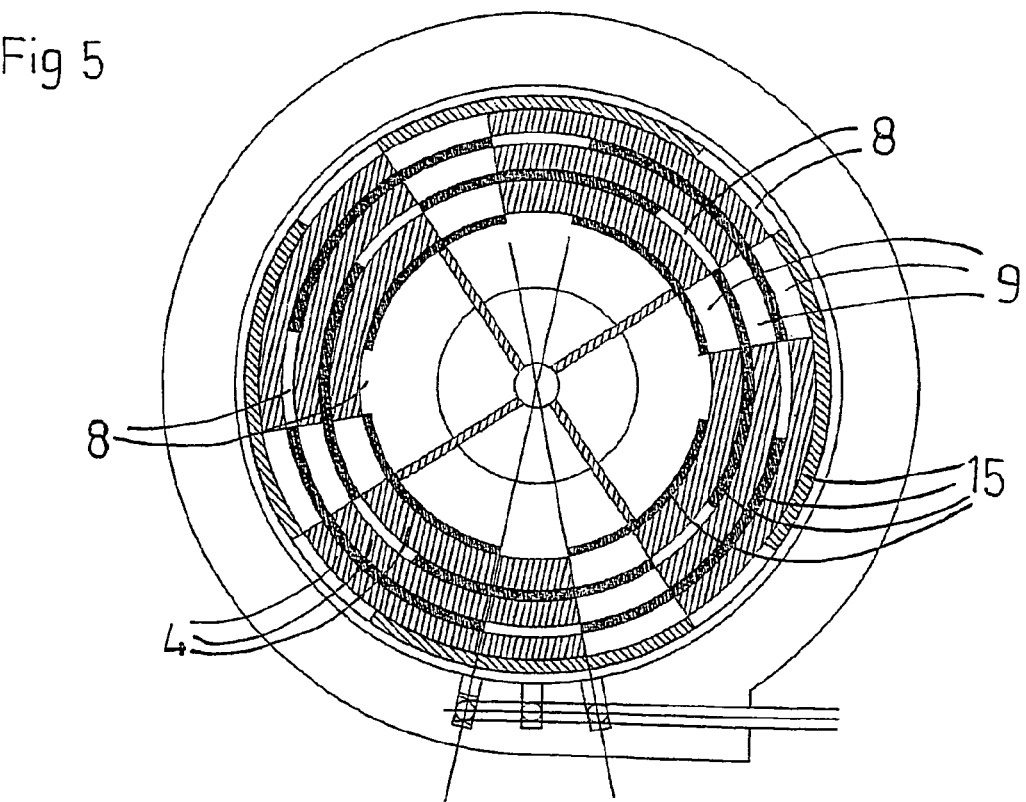

FIG. 2: illustrates an embodiment of a sluice feeder according to the present invention from above in a first position which lets material into the inner most portion pockets at the same time as material is released out of the middle portion pocket into the outer most portion pockets, FIG. 3: illustrates the sluice feeder in a second position where all portion pockets are closed by the stator, FIG. 4: illustrates the sluice feeder in a third position where the inner post portion pockets opened towards the middle portion pockets at the same time as the outer most portion pockets are open towards the outlet of the sluice feeder, and FIG. 5: illustrates the sluice feeder in a fourth position where all portion pockets again are closed by the stator.

DETAILED DESCRIPTION OF PREFERRED EMBODIMENTS

An embodiment of the sluice feeder according to the present invention is illustrated in FIG. 1. The material to be sluiced between a first medium and a second medium, sealed from the first medium, is fed in through an inlet tube 1 down to a rotor 2, more exactly towards the center portion of the rotor 2. The inlet 1 may, for example, be pressurized with a gas, such as steam. The material is thrown radially outwards by the rotor 2, which may as in the illustrated case be provided with conveying means 3 which aid to feed out the material radially.

The rotor 2 is provided with at least one concentric rotor ring 4 which forms a radial stop wall for the material when it is thrown out radially. In the illustrated case the rotor 2 is provided with three rotor rings 4. In each rotor ring 4 there is at least one opening 5 in radial direction, where each opening 5 is aligned with corresponding opening 5 in the concentric rotor rings 4. In the illustrated case, see FIG. 2, each rotor ring 4 is provided with four openings 5 and the openings 5 of each rotor ring 4 are aligned with the openings 5 of the other rotor rings 4 so that the three rotor rings 4 together form four passages radially directed towards the periphery of the rotor 2 and spaced 90° from each other.

In the sluice feeder a stator 7 is provided, which is provided with concentric stator rings 15, of which one is provided radially inside the rotor ring/-s and one is provided radially outside the rotor ring/-s and in the case that the rotor 2 is provided with more than one rotor ring 4 a stator ring 15 is provided between each rotor ring 4. In the illustrated case four stator rings 15 are provided.

Also the stator rings 15 are provided with at least one opening 8 each, preferably as many openings 8 per stator ring 15 as per rotor ring 4. The openings 8 of the stator rings 15 are however not aligned with each other but displaced from each other so that they can cover and leave open, respectively, the opening/-s in the rotor ring/-s 4.

In this way sealable pockets 9 are formed, radially delimited by the inside and outside, respectively, of the stator rings, (seen in the moving direction of the material) and sideways by the end edges 17 of the rotor rings at their openings 5. The passage formed by the openings 5 may thus be divided into portion pockets 9, as many as the number of rotor rings 4, by means of the stator rings 15. The size of the pocket 9 depends thus on the width of the opening 5 in the rotor ring 4 and the depth of the rotor ring 4 in radial direction.

At rotation of the rotor 2 the pocket or portion pockets 9 will successively open radially inwards at the same time as they are sealed radially outwards by a stator ring 15 and open radially outwards at the same time as they are sealed radially inwards by means of a stator ring 15, respectively.

The material that is fed through the inlet 1 reach the rotor 2 in it central portion and is thrown radially outwards by the rotation of the rotor 2 and by means of the conveying means 3. In FIG. 2 the sluice feeder is in a first position which allows the material to be fed into the inner portion pockets 9. When the rotor 2 further rotates (clockwise in the shown figures) the material in the inner portion pockets 9 will follow the rotation, whereby the inner portion pockets 9 will be sealed radially inwards by the inner most stator ring 15, see FIG. 3.

In FIG. 4 the rotor 2 has rotated as much as the inner portion pocket 9 may empty its content of material to the middle pocket 9 due to the fact that an opening 8 in the stator ring 15 has been reached. In FIG. 5 the material has been sealed off in the middle portion pocket 9 and also the inner and outer portion pockets are completely selade. What is occurring thereafter is that the first position, see FIG. 2, is reached again so that new material may be fed into the inner portion pocket 9 at the same time as the material in the middle portion pocket 9 is further fed out to the outermost portion pocket 9 since an opening 8 has been reached in the next outermost stator ring 15.

Thereafter all the portion pockets 9 are sealed, whereby the inner and the outer comprises material while the middle one is emptied of its content. In FIG. 4 it is thereafter seen that the material in the inner portion pocket 9 is emptied to the middle portion pocket 9 and the material in the outer portion pocket 9 is emptied out through an opening 8 in the outermost stator ring 15 and further through an opening 14 in a ring shaped valve 12, which is rotatably arranged around the outermost stator ring 15.

Thereafter all the portion pockets 9 are sealed agains, see FIG. 5, whereby only the middle portion pocket has a material content. The material emptied from the outermost portion pocket 9 falls down into an essentially circular chamber 10 from which the material is transported further out from the outlet 11 of the sluice feeder by means of the second medium, for example pressurized air or water. An inlet 16 for the second medium is preferably provided associating to the circular chamber 10 on the opposite side of the sluice feeder in relation to the outlet 11.

The ring shaped valve 12 is therefore setting desired size on the emptying opening to the circular chamber 10, i.e. the combination of the opening 8 in the outermost stator ring 15 and the opening 14 in the ring shaped valve 12.

The ring shaped valve 12 may for example be adjusted by means of a manouver rod 13. In such a way the compression and the thus the leakage between the outermost portion pocket 9 and the outlet 11 may be controlled.

Depending on the geometry of the stator 7 and the rotor 2 it can be determined if the material shall be compressed, and in such a case to which degree, or if it shall not be compressed during the transport through the sluice feeder. The higher the compression of the material the tighter the sluice feeder will be, whereby the leakage between the inlet 1 and the outlet 11 of the sluice feeder will be minimal. By means of the invention the inlet 1 will never be in direct contact with the outlet 11.

In the shown embodiment the portion pockets 9 have essentially the same volume. But the volume may of course be decreased with increasing radius in order to increase the density of the transported material or if so desired or be dimensioned in any other desired way.

The invention claimed is:

1. A sluice feeder comprising: an inlet for receiving material in a first medium at a higher pressure and discharging the material toward a center position of said rotor, said rotor including at least one concentric rotor ring, said at least one rotor ring having at least one opening in a radial direction from said inlet to an outlet for receiving material from said rotor and discharging the material in a second medium at a lower pressure; and a stator that is adapted to cooperate with said rotor, said stator including at least one stator ring having at least one opening therein, wherein at least one pocket is formed by said at least one opening of said rotor ring of said rotor and said at least opening of said stator ring of said stator, said at least one pocket alternatingly opens radially inwardly and radially outwardly and alternatingly seals radially inwardly or radially outwardly, upon rotation of said rotor relative to said stator so that the material is thrown radially outwardly by said rotor to said at least one pocket to be emptied from said at least one pocket to said outlet at the same time said at least one pocket is sealed radially inwardly toward said inlet by said at least one stator ring of said stator.

2. The sluice feeder according to claim 1, wherein said stator includes at least two concentric stator rings, whereby an inner stator ring radially seals an inlet to said at least one pocket formed by said opening of said rotor ring and whereby an outer stator ring radially seals an outlet from said at least one pocket.

3. The sluice feeder according to claim 1, wherein said rotor includes at least two concentric rotor rings and wherein said stator includes at least three stator rings, whereby an inner stator ring radially seals said at least one pocket formed by said opening of said rotor ring, whereby an outer stator ring radially seals an outlet from said at least one pocket, and whereby a stator ring is provided between each rotor ring for dividing said at least one pocket into radially separate portion pockets.

4. The sluice feeder according to claim 1, wherein said rotor (2) is provided with at least one conveying means for aiding a feeding of the material in a radial direction.

5. The sluice feeder according to claim 3, further comprising a ring shaped valve including at least one radial opening that is rotatably mounted around an outermost stator ring.

* * * * *